United States Patent [19]

Williams

[11] 4,191,022

[45] Mar. 4, 1980

[54] CHEMICAL PLANT

[75] Inventor: John A. Williams, Warrington, England

[73] Assignee: United Kingdom Atomic Energy Authority, London, England

[21] Appl. No.: 892,968

[22] Filed: Apr. 3, 1978

[51] Int. Cl.² .................. F25B 39/00; B01D 59/08
[52] U.S. Cl. ............................. 62/55.5; 62/12; 62/118; 55/82; 423/19
[58] Field of Search ............ 62/55.5, 93, 119, 324 B, 62/12, 118; 55/82, 71; 423/8, 19

[56] References Cited

U.S. PATENT DOCUMENTS

| | | | |
|---|---|---|---|
| 2,252,739 | 8/1941 | Stoever | 62/12 |
| 3,222,124 | 12/1965 | Anderson et al. | 423/19 X |
| 3,418,820 | 12/1968 | Swearingen | 62/12 |

*Primary Examiner*—William E. Wayner
*Attorney, Agent, or Firm*—Larson, Taylor and Hinds

[57] ABSTRACT

In a chemical plant the atmosphere under which a chemical process is performed is contained and continuously circulated by the driving force obtained by the alternate condensation and evaporation of a part of the atmosphere.

18 Claims, 1 Drawing Figure

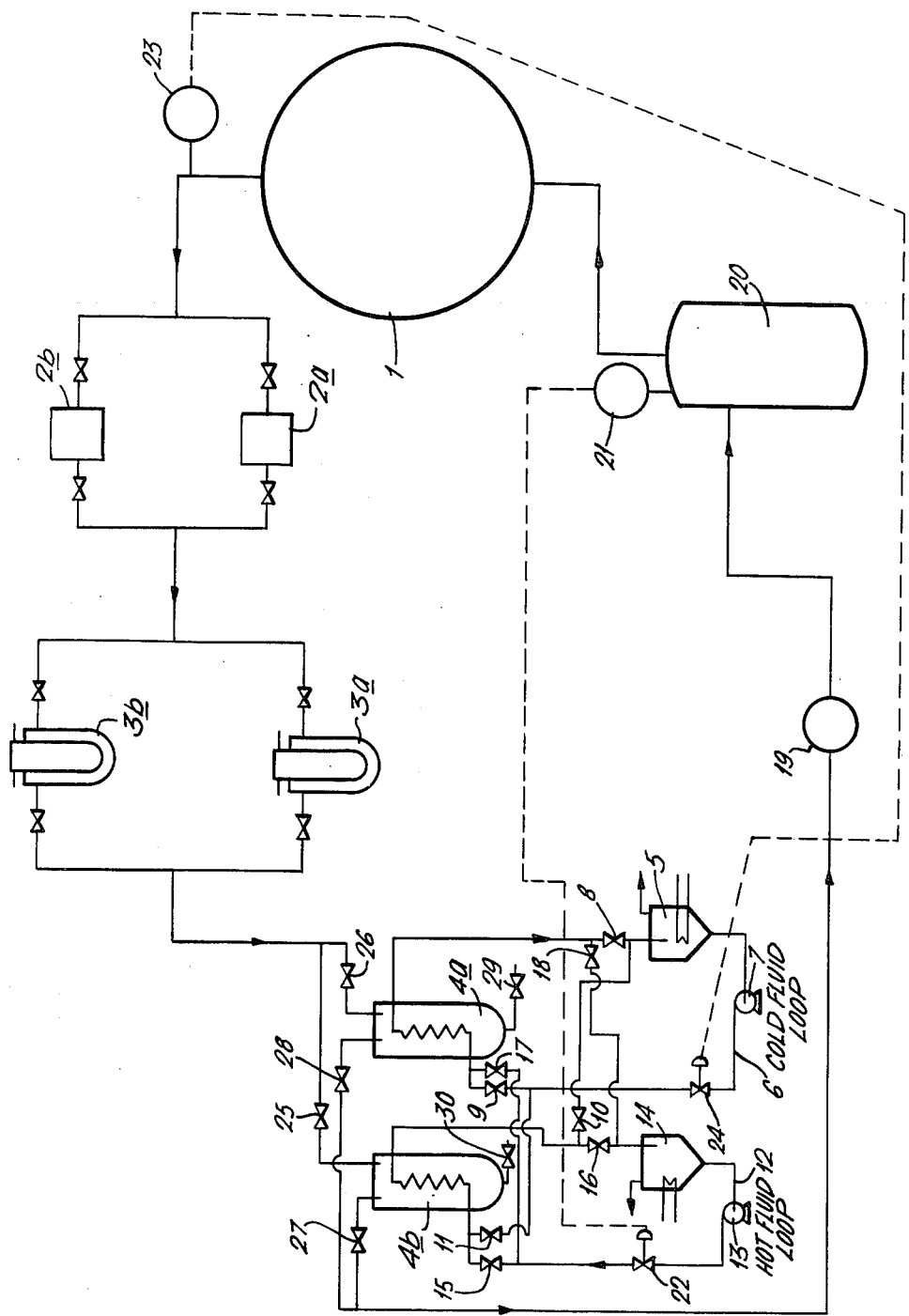

CHEMICAL PLANT

BACKGROUND OF THE INVENTION

This invention relates to the chemical plant and processes and particularly to plant and processes in which the atmosphere is contained and continuously circulated in a closed circuit. Such a plant may be used for processes in which egress of the atmosphere from the plant has to be avoided as is the case in a plant in which nuclear fuel is treated such as a plant in which irradiated nuclear fuels are reprocessed or in which plutonium-containing fuels are fabricated.

SUMMARY OF THE INVENTION

According to a first aspect of the present invention a plant in which the atmosphere is contained and continuously circulated in a closed circuit has means whereby circulation of the atmosphere is effected by the driving force obtained from the condensation of at least part of the atmosphere circulating in the plant in a first heat exchanger and the subsequent evaporation of the condensed atmosphere from said first heat exchanger, the plant also having a further heat exchanger in which evaporation of condensed atmosphere occurs when condensation is occuring in the first heat exchanger and condensation of at least part of the atmosphere occurs when evaporation is occurring in the first heat exchanger, the first and further heat exchanger being used alternately to provide a continuous driving force to effect circulation of the atmosphere.

According to a second aspect of the present invention a process in which the atmosphere under which the process is performed is contained in a plant and continuously circulated in a closed circuit includes the steps of alternately condensing and evaporating at least a part of the atmosphere circulating in the plant in each of a pair of heat exchangers, one of said pair of heat exchangers being used to condense said part of the atmosphere whilst the other of said pair of heat exchangers is used to evaporate to provide a continuous driving force to effect circulation of the atmosphere around the plant.

The alternate use of two heat exchangers provides the driving force for circulating the atmosphere within the plant and the use of a pump or fan for moving the atmosphere around the plant can be avoided.

The atmosphere in the plant may consist essentially of a gas which has a boiling point above $-100°$ C. Gases which sublime at temperatures above $-100°$ C. such as carbon dioxide and sulphur hexafluoride are particularly suitable. Other suitable gases include fluorocarbons having a boiling point above $-100°$ C. Table 1 lists several suitable gases and their boiling points.

Table 1

| | boiling pt. (°C.) | | boiling pt. (°C.) |
|---|---|---|---|
| $CO_2$ | $-78.5$ (sublimes) | $CCl_2F_2$ | $-29.8$ |
| $SF_6$ | $-63.9$ (sublimes) | $CBrF_3$ | $-57.8$ |
| $CH_3F$ | $-78.5$ | $CF_3-CF_3$ | $-47.6$ |
| $CH_2F_2$ | $-51.7$ | $CHF_2-CF_3$ | $-48.5$ |
| $CHF_3$ | $-82$ | $CClF_2-CF_3$ | $-38.7$ |
| $CHClF_2$ | $-40.8$ | $CF_3-CF_2-CF_3$ | $-36.7$ |
| $CClF_3$ | $-81.4$ | | |

The present invention finds one application in plant and processes for the reprocessing of irradiated nuclear fuel. In one known process for the reprocessing of irradiated nuclear fuel the irradiated nuclear fuel material is first dissolved in nitric acid and the acid solution which contains uranium, plutonium and fission product is contacted with an organic solvent in a solvent extraction process which effects separation of the uranium and plutonium values from the fission products and from each other. During the dissolution of the irradiated fuel material gaseous fission products such as iodine 129, krypton and xenon are released. These gaseous fission products may present a hazard if released into the environment and they are preferably retained in the plant.

DESCRIPTION OF THE DRAWINGS

The invention will be illustrated by the following description of a plant and process for the treatment of irradiated nuclear fuel. The description is given by way of example only and has reference to the accompanying drawing which is a schematic diagram of a plant for treating irradiated nuclear fuel.

DESCRIPTION OF THE PREFERRED EMBODIMENT

The drawing shows a cave 1 in which may be located a facility for breaking down irradiated fuel elements which have been removed from a nuclear reactor to enable the nuclear fuel material to be dissolved, a dissolver where irradiated nuclear fuel is dissolved in nitric acid or a solvent extraction plant. The cave 1 is filled with carbon dioxide. The carbon dioxide atmosphere is continuously circulated round the plant and on leaving the cave 1 is passed to one of two dryers 2a, 2b which are connected in parallel and are used alternately to remove water from the carbon dioxide, the water being removed from one dryer whilst the other is in use and has carbon dioxide passing through it. The carbon dioxide then passes to one of two cold traps 3a, 3b which are used alternately and in which condensible contaminants such as iodine are separated from the carbon dioxide.

The flow of carbon dioxide then passes to one of two heat exchangers 4a, 4b where the carbon dioxide is condensed as a film of solid carbon dioxide. The heat exchanger in which condensation occurs is cooled by a refrigerant which is circulated from a tank 5 round a cold fluid loop 6 by a pump 7. The cold fluid loop 6 contains valves 8, 9, 10, 11. When valves 8 and 9 are opened and valves 10 and 11 are closed the heat exchanger 4a is connected into the cold fluid loop 6 whereas when valves 10 and 11 are open and valves 8 and 9 are closed it is the heat exchanger 4b which is connected into the cold fluid loop. The temperature in the cold fluid loop 6 is conveniently around $-95°$ C. and the refrigerant may be a mixture of methylene chloride and chloroform in the ratio 90:10.

Whilst carbon dioxide is being condensed in one of the heat exchangers carbon dioxide to replace that being condensed is being evaporated from the other heat exchanger by passing a liquid at a temperature above the evaporation temperature of the condensed carbon dioxide through the heat exchanger. The liquid at this temperature is circulated in a hot fluid loop 12 by a pump 13. The liquid which may conveniently be at a temperature of $-65°$ C. is pumped from a tank 14 and the flow to one or other of the heat exchangers 4a, 4b is controlled by valves 15, 16, 17, 18. When valves 15 and 16 are open and valves 17 and 18 are closed the hot fluid 12 is connected to the heat exchanger 4b whereas when the valves 17 and 18 are open and the valves 15 and 16 are closed the heat exchanger 4a is connected to the hot fluid loop 12. A suitable liquid for use in the hot fluid loop 12 is a mixture of methylene chloride and chloroform.

The carbon dioxide evaporated from the heat exchanger passes back to the cave 1 through a heater 7 and a surge vessel 20. A pressure controller 21 communicating with the surge vessel 20 and linked to a valve 22 in the hot fluid loop 12 controls the rate of evaporation and a pressure controller 23 communicating with the cave 1 and linked to a valve 24 in the cold fluid loop 6 controls the rate of condensation.

The heat exchangers 4a, 4b are used alternately as condensors and evaporators, the function of the heat exchanger depending on which of the fluid loops 6, 12 is connected to the heat exchanger. The inflow to the heat exchangers is controlled by valves 25, 26 and the outflow is controlled by valves 27, 28.

As the carbon dioxide is condensed in one of the heat exchangers the gases such as krypton, xenon and any air which has leaked into the plant do not condense and may be removed by purging. The heat exchangers 4a, 4b are provided with outlets 29, 30 respectively to facilitate this purging. After purging the contaminant gases are recovered by known methods. The contaminant gases are at a much greater concentration in the purge gas than they are in the air stream leaving a plant in which ventilation is achieved by passing air through the plant, through decontamination facilities and then releasing the air to the atmosphere. It is therefore easier in a plant constructed in accordance with the present invention to separate the gases krypton and xenon from the atmosphere above a plant in which irradiated nuclear fuel is treated.

The driving force to circulate the carbon dioxide around the plant is provided by the condensation and evaporation of the carbon dioxide in the heat exchangers 4a, 4b. Thus there is no need to have pumps or fans to circulate the carbon dioxide. In plants in which radioactive materials are handled all operations have to be performed remotely to protect the operators from exposure to radioactivity. It is therefore advantageous to have no plant components, such as pumps and fans, which require maintenance.

In a plant in which nuclear fuel is treated it is necessary to filter the atmosphere of the plant to remove particulate radioactive materials. In a plant constructed according to the present invention the condensation of the carbon dioxide or other gas causes deposition of particulate materials in the heat exchangers and thus the need for filtration of the atmosphere is reduced.

I claim:

1. A plant in which the atmosphere is contained and continuously circulated in a closed circuit, circulation of the atmosphere being effected by the driving force obtained from the alternate condensation and evaporation of at least part of the atmosphere circulating in the plant, the plant comprising:
   a first heat exchanger,
   a second heat exchanger connected in parallel with the first heat exchanger,
   first valve means for directing the atmosphere circulating in the plant into one of the heat exchangers,
   second valve means for directing the atmosphere leaving the other of the heat exchangers so that it circulates around the plant,
   first circulating means for passing a refrigerant through said one of the heat exchangers to effect condensation of at least part of the atmosphere in said one of the heat exchangers,
   second circulating means for passing a liquid at a temperature above the evaporation temperature of the condensed atmosphere through said other heat exchanger to effect evaporation of condensed atmosphere in said other heat exchanger, and
   switching means for operating the first and second valve means to alternately direct the atmosphere circulating around the plant into the heat exchangers said switching means also operating the first and second circulating means to direct the refrigerant so that is passes through the heat exchanger in which condensation is occurring and to direct the liquid to the heat exchanger in which evaporation of condensed atmosphere is occurring,
   the heat exchangers being used alternately for condensation and evaporation to provide a continuous driving force to effect circulation of the atmosphere around the plant.

2. A plant as claimed in claim 1 including a vessel in which nuclear fuel is treated and through which the atmosphere is circulated by the driving force obtained from the condensation of at least part of the atmosphere in one of said heat exchangers and the evaporation of condensate from the other of said heat exchangers.

3. A plant as claimed in claim 2 wherein dryers are provided to remove water and cold traps are provided to remove iodine from the circulating atmosphere before it passes to the heat exchangers.

4. A plant as claimed in claim 2 wherein means are provided to purge the heat exchangers to remove gases which do not condense during the condensation of said part of the atmosphere.

5. A plant as claimed in claim 1 wherein the atmosphere comprises a gas the boiling point of which is about $-100°$ C.

6. A plant as claimed in claim 1 wherein the atmosphere comprises a gas which sublimes at a temperature above $-100°$ C.

7. A plant as claimed in claim 6 wherein the gas is carbon dioxide.

8. A plant as claimed in claim 6 wherein the gas is sulphur hexafluoride.

9. A plant as claimed in claim 5 wherein the gas is a fluorocarbon.

10. A process in which the atmosphere under which the process if performed is contained in a plant and continuously circulated in a closed circuit including the steps of alternately condensing and evaporating at least a part of the atmosphere circulating in the plant in each of a pair of heat exchangers, one of said pair of heat exchangers being used to condense said part of the atmosphere whilst the other of said pair of heat exchangers is used to evaporate to provide a continuous driving force to effect cicrulation of the atmosphere around the plant.

11. A process as claimed in claim 10 wherein the atmosphere comprises a gas the boiling point of which is about $-100°$ C.

12. A process as claimed in claim 10 wherein the atmosphere comprises a gas which sublimes at a temperature above $-100°$ C.

13. A process as claimed in claim 12 wherein the gas is carbon dioxide.

14. A process as claimed in claim 12 wherein the gas is sulphur hexafluoride.

15. A process as claimed in claim 11 wherein the gas is a fluorocarbon.

16. A process as claimed in claim 10 wherein the atmosphere is circulated through a vessel in which nuclear fuel is being treated.

17. A process as claimed in claim 10 wherein the atmosphere circulating in the plant is dried to remove water vapour and cooled to cause removal of iodine between the vessel and the heat exchangers.

18. A process as claimed in claim 10 or claim 12 wherein the heat exchangers are purged during condensation to remove gases which do not condense.